United States Patent
Liu et al.

(10) Patent No.: US 7,567,817 B2
(45) Date of Patent: *Jul. 28, 2009

(54) METHOD AND APPARATUS FOR AN EXTRUDED CERAMIC BIOSOLUBLE FIBER SUBSTRATE

(75) Inventors: James Jenq Liu, Mason, OH (US); Bilal Zuberi, Cambridge, MA (US)

(73) Assignee: GEO2 Technologies, Inc., Woburn, MA (US)

( * ) Notice: Subject to any disclaimer, the term of this patent is extended or adjusted under 35 U.S.C. 154(b) by 267 days.

This patent is subject to a terminal disclaimer.

(21) Appl. No.: 11/748,306

(22) Filed: May 14, 2007

(65) Prior Publication Data

US 2008/0286179 A1 Nov. 20, 2008

(51) Int. Cl.
*B01J 32/00* (2006.01)
(52) U.S. Cl. .......................... 455/523; 55/522; 55/524; 502/439; 264/43; 264/44; 264/623; 264/628; 264/630; 264/638; 264/654; 264/656

(58) Field of Classification Search ................. 502/439; 455/523; 55/522, 524; 264/43, 44, 623, 264/628, 630, 638, 654, 656
See application file for complete search history.

(56) References Cited

U.S. PATENT DOCUMENTS

| 4,659,610 A | 4/1987 | George |
| 4,737,192 A | 4/1988 | Smith |
| 5,981,415 A | 11/1999 | Waku et al. |
| 7,486,962 B2 * | 2/2009 | Zuberi et al. ................ 455/523 |
| 2005/0079975 A1 | 4/2005 | Fujita |
| 2005/0272602 A1 | 12/2005 | Ninomiya |
| 2006/0120937 A1 | 6/2006 | Zuberi |
| 2007/0068128 A1 | 3/2007 | Oshimi et al. |
| 2007/0092692 A1 | 4/2007 | Masukawa et al. |

* cited by examiner

*Primary Examiner*—Stuart Hendrickson
*Assistant Examiner*—Michelle Hou (57) ABSTRACT

A porous ceramic substrate is disclosed that is fabricated from biosoluble ceramic fibers. Porosity and permeability of the substrate is provided by intertangled biosoluble fibers, that can be formed into a honeycomb form substrate through an extrusion process. The fibrous structure is formed from mixing biosoluble fibers with additives that include a bonding agent, and a fluid to provide an extrudable mixture. The structure is sintered at a temperature that exceeds the glass formation temperature of the bonding agent, but less than the maximum operational limits of the biosoluble fiber, to form a structure that has sufficient strength and porosity to provide for filtration and/or as a catalytic host.

20 Claims, 3 Drawing Sheets

FIG. 5 ously high doses of respirable fibers can cause fibrosis in test animals. RCF, however, has recently been added to the list of reasonably anticipated human carcinogens in the U.S. Department of Health and Human Services' Report on Carcinogens. Additionally, the European Union (EU) classifies RCF as a Category 2 Carcinogen.

METHOD AND APPARATUS FOR AN EXTRUDED CERAMIC BIOSOLUBLE FIBER SUBSTRATE

BACKGROUND OF THE INVENTION

The present invention related generally to porous ceramic substrates useful for filtration and/or high temperature chemical reaction processing, such as a catalytic host. The invention more particularly relates to a substantially biosoluble fiber-based ceramic substrate and methods for producing the same.

Ceramic honeycomb substrates are commonly used in industrial automotive applications where inherent material stability and structural integrity are needed at elevated operating temperatures. Ceramic honeycomb substrates provide high specific surface area for effective filtration and support for efficient catalytic reactions. For example, in automotive applications, ceramic substrates are used in catalytic converters to host catalytic oxidation and reduction of exhaust gases, and to filter particulate emissions.

Fiber-based ceramic substrates can be produced to provide a highly porous yet chemically and mechanically durable substrate for high temperature applications. Commonly owned U.S. Pat. No. 6,946,013, and commonly-owned U.S. patent application Ser. Nos. 11/323,429 filed Dec. 30, 2005, Ser. No. 11/322,777 filed Dec. 30, 2005, and Ser. No. 11/323, 430 filed Dec. 30, 2005, all incorporated by reference herein, describe various methods and applications for highly porous fiber-based substrates. The raw materials used to fabricate such substrates may be subject to regulations in some jurisdictions that require special handling and/or hazardous product labeling. To avoid the effect of regulatory controls, and to minimize the potential for exposure to potentially hazardous materials by those involved in the manufacture of such substrates, ceramic fibers having compositions that are deemed to be biosoluble, i.e., soluble within a human or living organism, can be used.

Biosoluble fibers have been developed for use as a replacement for refractory ceramic fibers. These fibers can be exonerated from classification as a hazardous material, under currently-known regulatory directives. These biosoluble replacements are typically intended for insulation and refractory applications, where strength and chemical durability is not a primary concern. However, when implemented as the primary constituent in a porous ceramic substrate for high temperature filtration and/or chemical reaction processing using known methods of fabrication, the reduced strength and durability of these fibers detracts from the performance of the substrate in intended applications.

Accordingly, there is a need for a biosoluble fiber-based ceramic substrate that can be manufactured using methods to produce a substrate that provide sufficient strength and durability for high temperature filtration and/or chemical reaction processing.

BRIEF SUMMARY OF THE INVENTION

The present invention provides a biosoluble fiber-based ceramic substrate and methods of manufacture of the same. Accordingly, the object of the invention is directed at methods and processes for forming a biosoluble fiber-based structure and apparatuses or formed shapes having a porous fibrous structure from biosoluble fibers.

Specifically, the invention is directed at an extruded honeycomb substrate that is formed from biosoluble fibers. The honeycomb substrate has an array of channels forming walls between adjacent channels, with the wall formed from intertangled biosoluble fibers. The strength of the substrate is derived from the biosoluble fibers and bonds between overlapping and adjoining fibers within the structure. Bonding agents, such as precursors to glass, glass-ceramic and ceramic, are included to provide reaction-formed or sintered bonds.

An aspect of the invention is to provide mechanical, chemical, and thermal durability to the biosoluble fiber through the formation of bonds between the fibers. In one aspect, the coefficient of thermal expansion of the bond is substantially the same as the coefficient of thermal expansion of the biosoluble fiber.

The present invention is directed at methods to produce a porous substrate using biosoluble fibers. In this aspect of the invention, biosoluble fibers are mixed with additives and a fluid to form an extrudable mixture. The extrudable mixture is extruded into a green substrate that is then cured to form the porous substrate. An inorganic additive is included in the extrudable mixture, that is used to reaction-form bonds between the biosoluble fibers during the curing process.

In yet another aspect of the invention, a filter is provided that includes an extruded honeycomb substrate having intertangled fibers composed of silica and an alkali metal compound or an alkali-earth metal compound, such as calcium, magnesium or boron oxide compounds.

These and other features of the present invention will become apparent from a reading of the following descriptions, and may be realized by means of the instrumentalities and combinations particularly pointed out in the appended claims.

BRIEF DESCRIPTION OF THE SEVERAL VIEWS OF THE DRAWING

The drawings constitute a part of this specification and include exemplary embodiments of the invention, which may be embodied in various forms.

DETAILED DESCRIPTION OF THE INVENTION

Detailed descriptions of examples of the invention are provided herein. It is to be understood, however, that the present invention may be exemplified in various forms. Therefore, the specific details disclosed herein are not to be interpreted as limiting, but rather as a representative basis for teaching one skilled in the art how to employ the present invention in virtually any detailed system, structure or manner.

Refractory Ceramic Fibers (RCF) are commonly known as aluminosilicate ceramic materials that along with fibrous glass and mineral wool, are generally classified as synthetic vitreous fibers. When humans are exposed to synthetic vitreous fibers suspended in air, irritation of the eyes, nose, throat, and lung can occur. These exposure effects are reversible, and such effects disappear once exposure ceases. Unlike asbestos, synthetic vitreous fibers have not been linked to the cause of disease in humans, though animal studies show that repeatedly breathing air containing large quantities of synthetic vitreous fibers can lead to inflammation and fibrosis of the lung. Based on these animal studies, RCFs have been deemed to be a possible carcinogen by several national and international regulatory bodies, including the US Environmental Protection Agency and the World Health Organization's International Agency for Research on Cancer (IARC). The concern raised by these organizations is that if pulmonary inflammation continues over extended periods, scar tissue may develop in the lungs (pulmonary fibrosis) and the pleura membrane that surrounds the lungs (pleural fibrosis).

Though RCFs are commonly used as insulating refractory bricks or panels in high temperature processing equipment, such as kilns, ovens, boilers and furnaces, the potential risk for occupational exposure exists in the fabrication of these product, including, for example, the fabrication of fiber-based porous ceramic substrates. Most applications that use RCFs typically encapsulate the fibers within the final product, and thus, the general public is not at risk for exposure when using products containing such fibers. Further, it is generally understood that proper handling procedures can be instituted to minimize the risks of exposure, and extruded honeycomb filters fabricated using RCFs have been shown to not emit fibers during operation. Nevertheless, the IARC determined that RCFs are a possible carcinogen to humans because of their relatively high biopersistence and due to the findings relating to research using animals exposed to high levels of fiber materials. Similarly, the US Environmental Protection Agency has classified RCFs as a probably human carcinogen.

In order to reduce the health risks of exposure to RCFs, the chemical composition of these ceramic fibers can be adapted to classify the fibers as biosoluble. The term "biosoluble fibers," as used herein, includes synthetic vitreous fibers that capable of exoneration from classification as a carcinogen as a result of biopersistence testing. Biosoluble fibers include, for example, inorganic fibers composed of silica (about 60 to 85 weight percent) and an alkali metal compound, an alkali-earth metal compound or a boron compound (about 15 to 40 weight percent). Examples of the alkali metal compound include oxides of sodium and potassium. Examples of the alkali-earth metal compound include oxides of magnesium, calcium, and barium. Examples of the boron compound include oxides of boron. The inclusion of specific amounts of these compounds with silica determine not just the degree of biopersistence, but also the thermal, chemical, and mechanical properties of the resulting fiber (such as, for example, melting point, reactivity in chemically active environments, and tensile strength, etc.), and the properties of the articles fabricated using these fibers, such as extruded fiber-based honeycomb substrates. Biosoluble fibers can also include fibers made from biological compounds and materials, such as, for example, synthetic bone.

A commercially available biosoluble fiber can be obtained from Unifrax Corporation, Niagara Falls, N.Y., called "ISOFRAX", which is a vitreous magnesium-silicate fiber having in-vitro solubility characteristics, and operational temperature capabilities up to 1260° C. The INSULFRAX fibrous products from Unifrax are calcium-magnesium-silicate biosoluble fibers that conform to current European regulatory requirements for RCFs. Alternatively, SUPERWOOL family of products, available from Thermal Ceramics, of Augusta, Ga., are biosoluble, with a special alkaline earth composition fibers that have a demonstrated low biopersistence rating.

Adaptation of ceramic compositions to attain biosolubility impacts the thermal, chemical, and mechanical durability of the material. When these fibers are used as the basis for porous ceramic substrates, the compositional adaptation required in order to attain acceptable levels of biopersistence results in a reduction in the operational durability of the fiber, resulting in potentially weak structures formed using the fiber. The formation of glass or ceramic bonds during fabrication of the substrate using prior art methods destroys the fiber integrity at high temperature caused by devitrification, corrosion degradation, and melting. Additionally, it has been found that certain processing of the biosoluble fibers when forming a porous substrate, such as in the formation of glass or ceramic bonds using methods according to the prior art, can result in free silica, in an amorphous or crystalline form. Silica can be undesirable in some applications, in that it may inhibit the use of some catalyst materials. Additionally, silica may precipitate cristabolite (crystal silica) at certain temperatures, such as, for example, the devitrification temperature of the fiber. Cristabolite is a crystal phase of silica that has been designated as a known carcinogen with prolonged exposure in a dust form, thereby creating a new hazard in the attempt to reduce another. The present invention has been found to form durable fibrous substrates without degradation of the biosoluble fiber, and without the formation of cristabolite.

Figure 1:
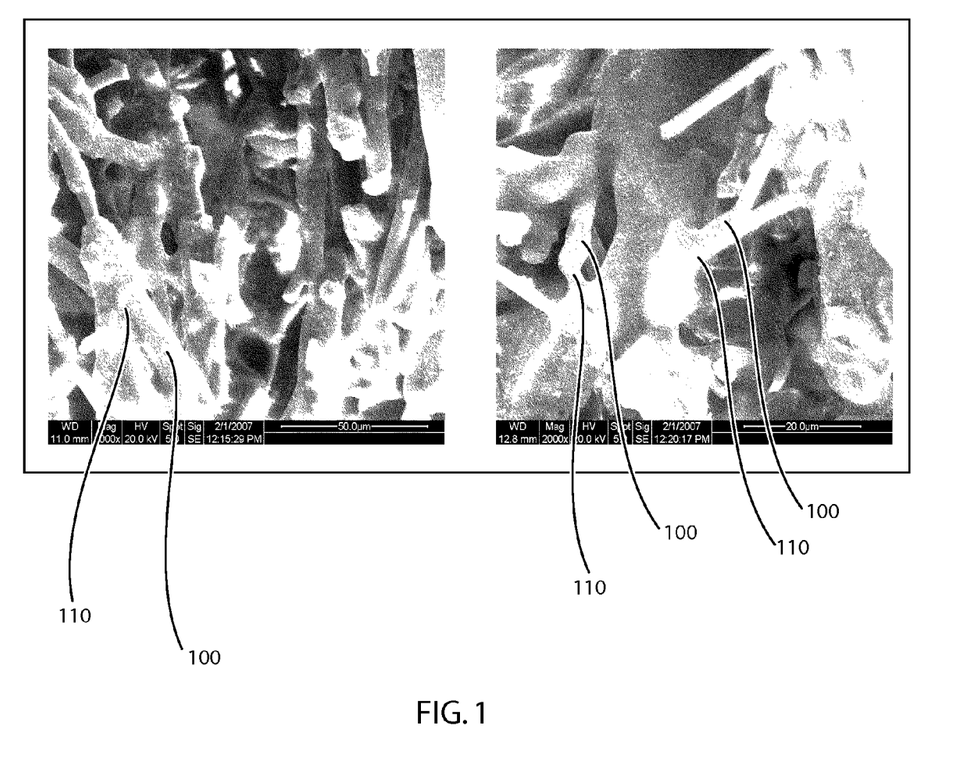
FIG. 1 is an image representation of the microstructure of a substrate according to the present invention.

In order to form a porous structure using biosoluble fibers with sufficient mechanical, chemical, and thermal durability, a reaction-formed bonding phase is herein provided. Referring to FIG. 1, scanning electron images of a porous ceramic structure of the present invention is shown. Biosoluble fibers 100 are intertangled with adjacent fibers with bonds 110 between adjoining fibers within the structure. The intertangled biosoluble fibers 100 form a network of open pores between the fibers to create porosity in approximately a range between 40% and 80%.

The bonds 110 between the biosoluble fibers 100 are formed by reaction with a bonding agent in a bonding process that facilitates the formation of bonds, but does not degrade the chemical composition of the biosoluble fibers, or precipitate cristabolite from the fiber. In one embodiment of the invention, a frit composition is used as the bonding agent to form glass bonds between fibers to provide reaction bonds between adjoining fibers. The selection of an appropriate frit for such bonding should be made to closely match the coefficient of thermal expansion of the biosoluble fiber, and the frit should have a glass transition temperature less than the operational temperature limits of the biosoluble fiber. For example, a glass bond can be formed using a borosilicate frit having a glass transition temperature of approximately 1,100° C. with the ISOFRAX fiber having an operational temperature limitation of 1,260° C. During the reaction-formation of such bonds, the bonds 110 that form are glass bonds that react with, and coat the surfaces of the biosoluble fiber 100 to bond adjoining fibers. The bonding process, described in more detail below, is performed at a temperature that is at least at or above the glass transition temperature of the frit, while maintained below the maximum operation temperature of the fiber.

In a second embodiment of the invention, a sol is used as the bonding agent to form glass bonds between fibers to provide reaction bonds between adjoining fibers. The sol solution can be provided with appropriate constituents to form glass bonds of a particular composition to attain a desired glass transition temperature, viscosity and thermal expansion properties. Ideally, the glass composition should match the thermal expansion properties of the fiber, with a sufficiently low viscosity at a glass formation temperature that is less than the operational limits in order to flow and form bonds. For example, a boric acid alumina sol, described in more detail below, can be provided to form a glass bond with ISOFRAX fiber at a temperature less than the 1,260° C.

operational temperature limitation. Other examples and embodiments will be described further below.

Figure 2:
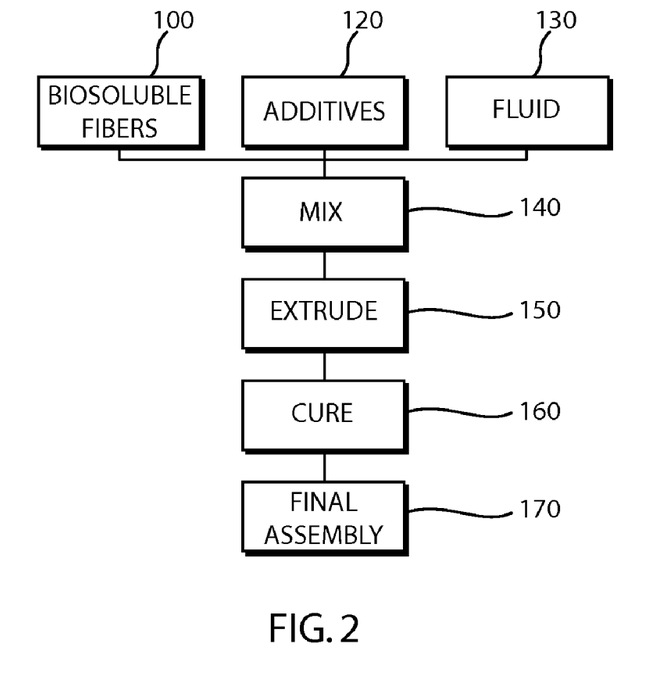
FIG. 2 is a flowchart of the method according to the present invention.

Referring to FIG. 2, a method for forming a porous substrate using biosoluble fibers is shown. Generally, biosoluble fibers 100 are mixed with additives 120 and a fluid 130 at mixing step 140 to provide an extrudable mixture. The extrudable mixture is then extruded into a green substrate at extrusion step 150, which is then cured at curing step 160 with final assembly performed at assembly step 170. A porous structure comprising an open network of pores formed from intertangled biosoluble fibers having bonds between adjoining fibers.

The biosoluble fibers 100 can be provided in bulk form, or as chopped fibers. The diameter of the biosoluble fiber 100 can be 1 to 30 microns in diameter, however, the optimal diameter of the fiber depends on the intended application. When used for exhaust filtration applications, such as high temperature particle extraction, a preferred fiber diameter of 3 to 10 microns can be used. The subsequent mixing and extrusion processing will result in shear forces that will shorten the length of at least a portion of the fibers, so that the fibers have length to diameter aspect ratio between 3 and 50,000 in the final state after extrusion, though the aspect ratio can be expected to be in the range of 1:100,000.

The additives 120 include organic and inorganic additives that include bonding agents, binders, pore formers, extrusion aids, plasticizers, rheology modifiers, or other processing aids. Bonding agents are materials that are intended to reaction form bonds between the biosoluble fibers, as described in more detail below. A binder component to the additives 120 is necessary to provide green strength of the substrate until the final structure is formed in the curing step 160, by retaining the relative position of the biosoluble fibers 100. In some cases, a binder system that can be thermally disintegrated by converting into volatile species at a temperature significantly less than the glass transition temperature of the bonding agent and/or the operational temperature limitations of the biosoluble fiber 100. Acceptable binders include methylcellulose, hydroxypropyl methylcellulose (HPMC), ethylcellulose and combinations thereof.

Pore formers can be included as additives 120 to enhance the porosity of the final structure. Pore formers are non-reactive materials that occupy volume in the extrudable mixture during the mixing step 140 and the extrusion step 150, though are readily removed during the curing step 160 via pyrolysis or by thermal degradation or volatilization. For example, microwax emulsions, phenolic resin particles, flour, starch, or carbon particles can be added as an additive 120 that will burn out during the subsequent curing step 160. The pore former can also impart fiber alignment characteristics during extrusion, depending upon the distribution of particle shape or aspect ratio. Bonding agents can also act as a pore former when they are provided in a low density form, such as hollow spheres or aerogels.

Other processing aids, such as plasticizers, or rheology modifiers can be added as additives 120 to improve or optimize the extrudability of the extrudable mixture during the subsequent extrusion step 150. The pore former materials or bonding agents can also act as processing aids when the materials are selected to provide lubricity or rheological improvements in the extrudable mixture. For example, the use of carbon particles as a pore former acts as a lubricant during the extrusion step 150 to reduce the frictional forces imparted on the material by the extrusion die, thereby reducing the pressure and wear of the die.

The fluid 130 is added as needed to attain a desired rheology suitable for extrusion. Water is typically used, though solvents of various types can be utilized, along with liquids associated with additives 120, such as bonding agents or other additives, that may be introduced into the mixture as a colloidal or sol suspension in a liquid. Rheological measurements can be made during the mixing process 140 to evaluate the rheology of the mixture compared with a desired rheology for the extrusion step 150.

The biosoluble fibers 100, additives 120, and fluid 130 are mixed at the mixing step 140 to evenly distribute the materials into a homogeneous mass with a desired rheology for extrusion in the subsequent extrusion step 150. This mixing may include dry mixing, wet mixing, shear mixing, and kneading, which is necessary to evenly distribute the material into a homogeneous mass while imparting requisite shear forces to break up and distribute or de-agglomerate the fibers, particles, and fluid. The amount of mixing, shearing, and kneading, and duration of such mixing processes depends on the selection of fibers 100, additives 120, and fluid 130, along with the selection of the type of mixing equipment used during the mixing step 140, in order to obtain a uniform and consistent distribution of the materials within the mixture, with the desired Theological properties that are desired for the extrusion process 150.

Extrusion of ceramic materials is generally considered to be the most cost efficient method for producing honeycomb ceramic substrates. Other methods of forming honeycomb substrates are known to one skilled in the art, such as casting, injection molding, broaching, and others, which are contemplated to fall within the scope of the appended claims. For the purposes of this description, the method for shaping the mixture into a honeycomb substrate form will be described as the preferred extrusion process.

The extrusion process for the mixture of biosoluble fibers 100, additives 120, and a fluid 130 according to the present invention is similar to the extrusion of powder-based ceramic materials. The mixture containing a suitable plasticizing aid such as HPMC, and having a suitable rheology, is forced under pressure through a honeycomb die to form a generally continuous honeycomb block that is cut to a desired length. The honeycomb die determines the size and geometry of the honeycomb channels, and can be rectangular, triangular, hexagonal, or other polygonal shaped channels, depending on the design of the extrusion die. Additionally, alternative designs, such as asymmetric channels, with wider inlet channels can also be implemented using appropriate extrusion dies. The extrusion system used for the extrusion step 150 can be of the type typically used to extrude powder-based ceramic materials, for example, a piston extruder or screw-type extruder. One skilled in the art will appreciate that certain aspects of the mixing step 140 can be performed in a screw extruder during the extrusion step 150. The extrusion step 150 produces a green substrate, which has sufficient green strength to hold its shape and fiber arrangement during the subsequent curing step 160.

Extruding the extrudable mixture of biosoluble fiber 100, additives 120 and fluid 130 creates a unique microstructure of intertangled fibers in a honeycomb substrate. Shear forces that act upon the material as it is forced through the die result in a general tendency for orientation of the fibers in the direction of extrusion along the wall surface of the honeycomb channels. It will be appreciated that specific die designs and material rheologies, including the specification of certain length and diameter fiber distributions, the orientation behavior can be altered and controlled. Within the channel walls, the fibers are generally aligned in the extrusion direction due to the shear forces imparted on the material during extrusion, but the alignment can be less than the alignment of the fibers at the wall surface. The resulting microstructure has an even distribution of relatively small spacing between the aligned fibers at the surface of the channel wall, with a broader range of spacing between fibers within the channel walls. After the subsequent curing step 160, when certain portions of the additives 120 and fluid 130 are removed while still retaining the relative fiber spacing throughout the substrate, the resulting structure becomes porous. The porosity of the substrate, as a result of the alignment of the fibers during extrusion, exhibits an even distribution of small pores at the channel walls, with a broader distribution of pores within the open network of pores resulting from the spacing between fibers. Additionally, while the surface of the channel walls can be viewed as more akin to a two-dimensional mat of interlocked and interconnected fibers, distinguished by the internal regions of the channel wall, which is a three-dimensional structure of interlocked and interconnected fibers, the surface of the channel walls is not entirely planar. Fiber ends have a tendency to protrude out at an angle from the surface. These protrusions are particularly useful when the substrate is used as a filter, such as a diesel particulate filter, since the protrusion can act as nucleation, coagulation or trapping sites for soot, leading to efficient and uniform soot "cake" formation. The distribution of these sites over the surface of the channel walls ensures that a uniform accumulation of particulates can accumulate, which acts to improve trapping efficiency, more uniform deposition and regeneration of the soot on the filter.

The alignment of fibers, pore size, pore distribution, nucleation, coagulation, and trapping site distribution, and pore characteristics between wall surface and internal regions can be controlled by altering parameters of the extrusion process. For example, the rheology of the mixture, diameter and aspect ratio distributions of the fibers, characteristics of the additives, extrusion die design, and extrusion pressure and speed can be varied to attain desired characteristics in the resulting structure of the substrate.

Figure 3:
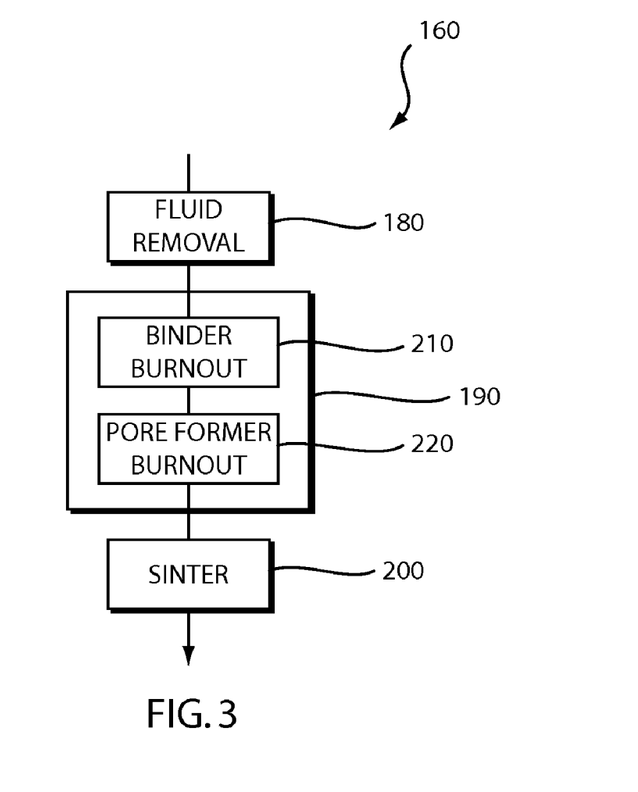
FIG. 3 is a flowchart of the curing step of the method of the present invention.

The curing step 160 is further described in reference to FIG. 3. The curing step can be performed as the sequence of three phases: a fluid removal step 180; an organic removal step 190; and a sintering/bonding step 200. In the first phase, fluid removal 180, the green substrate is dried by removing the fluid using relatively low temperature heat with or without forced convection to gradually remove the fluid. Various methods of applying relatively low temperature heat into the green substrate to remove the fluid, such as, heated air convection heating, vacuum freeze drying, solvent extraction, microwave or electromagnetic/radio frequency (RF) drying methods. The fluid within the extruded green substrate must not be removed too rapidly from the substrate so that drying cracks due to shrinkage do not form. Typically, for aqueous based systems, the green substrates can be dried when exposed to temperatures between 90° C. and 150° C. for a period of about one hour, though the actual drying time may vary due to the size and shape of the substrates, with larger parts often taking longer to fully dry. In the case of microwave or RF energy drying, the fluids themselves, or other constituents in the extruded material adsorb the radiation to more evenly generate heat throughout the material. During the fluid removal step 180, depending on the selection of materials used as additives 120, the materials acting as a binder can congeal or gel to provide sufficient green strength of the substrate for handling purposes.

Once the green substrate is dried, or substantially free of the fluid 130 by the fluid removal step 180, the next phase of the curing step 160 proceeds to the organic removal step 190. This phase of the curing step 160 removes any organic components of the additives 120 through pyrolysis or by thermal degradation or volatilization, leaving substantially only the biosoluble fibers 100 and the inorganic constituents of the additives 120. The organic removal step 190 can be further parsed into a sequence of component removal steps, such as a binder burnout step 210 followed by a pore former burnout step 220, when the organic constituents of the additives 120 are selected such that the curing step 160 can sequentially removes the components. For example, when HPMC, when used as a binder, will thermally decompose at approximately 300° C. When a carbon particle pore former is used, the carbon will oxidize into carbon dioxide when heated to approximately 600° C. in the presence of oxygen. Similarly, flour or starch, when used as a pore former, will thermally decompose at temperatures between 300° C. and 600° C. Accordingly, the green substrate using HPMC as a binder component of the additives 120 and a carbon particle pore former component of the additives 120 can be processed for organic removal 190 by subjecting the substrate to a two-step firing schedule to remove the binder and then the pore former. In this example, the binder burnout step 210 can be performed at a temperature of at least 300° C., but less than 600° C. for a period of time, followed by the pore former burnout step 220 at a temperature of at least 600° C., but less than the glass formation temperature of the bonding agent component of the additives 120. The thermally-sequenced curing step provides for a controlled removal of the additives 120 necessary to facilitate the extrusion process, and those that enhance the final microstructure of the substrate.

Alternatively, the curing step 160 can be sequentially controlled into any number of steps by controlling the environment thermally and/or chemically. For example, the binder burnout step 210 can be performed at a certain temperature in an inert environment, by purging the environment with an inert gas such as argon, nitrogen, helium, or by heating in a vacuum environment, or a partial vacuum purged with a low partial pressure of an inert gas. The pore former burnout step 220 can then be initiated and maintained through the introduction of oxygen into the curing environment. In this manner, the temperature must be maintained below the glass formation temperature of the bonding agent component of the additives 120, and also below the operational temperature limitations of the biosoluble fiber 100.

Further, the organic removal step 190, including each of the binder burnout step 210 and the pore former burnout step 220, must be controlled, either thermally or chemically, so that any exothermic reactions do not elevate the temperature within the substrate within a range of either the glass formation temperature of the bonding agent component of the additives 120 or the operational limitation temperature of the biosoluble fiber 100. This level of control can be implemented through process control of the heating environment, or by metering the flow of oxygen into the heating environment.

During the organic removal step 190 of the curing step 160, as the organic components of the additives 120 are removed, the relative position of the biosoluble fibers 100 remains substantially the same as when the green substrate is formed during the extrusion step 150. The biosoluble fibers are in an intertangled relationship, with the additives 120 providing support. As the organic components of the additives 120 are removed, the inorganic components remain, such as the bonding agent, to provide support for the fibers. Upon completion of the organic removal step 190, the mechanical strength of the substrate may be quite fragile, and the substrate may require careful handling procedures. It may be advantageous to perform the organic removal step 190 and the subsequent sintering step 200 in the same oven or kiln to minimize damage to the substrate due to handling.

The final phase of the curing step 160 is the sintering step 200. In this phase, the green substrate, substantially free of the fluid 130 and substantially free of organic components of the additives 120, is heated to a temperature exceeding the glass formation temperature of the bonding agent component of the additives 120 to reaction-form bonds 110 between adjoining biosoluble fibers 100. In this sintering step 200, the processing environment must heat the substrate to the desired temperature, without exceeding the operational temperature limitations of the biosoluble fiber 100. The operational temperature limitation, and thus, the desired sintering temperature, should be less than the devitrification temperature of the fiber and determined to prevent the precipitation of cristabolite from the amorphous silica in the fiber. Upon removal of the fluid and organic material, the bonding agent component of the additives 120 are evenly distributed throughout the fibrous structure. When the bonding agent component of the additives 120 is heated above its glass formation temperature, the bonding agent flows around the biosoluble fibers, reacting with the fibers to form a glass coating and/or glass bonds at adjoining ones of the intertangled biosoluble fibers. Additionally, fibers clustered adjacently can be bonded together to form fiber bundles that are bonded to other adjacent or adjoining fibers or fiber bundles.

The reaction-formed bonds 110 between adjoining ones of the intertangled biosoluble fibers 100 can be glass bonds having a composition substantially the same as the composition of the bonding agent component of the additives 120. The reaction-formation of the bonds 110 can also be a reaction between the bonding agent component of the additives 120 and certain constituents of the composition of the biosoluble fiber 100, to form a glass bond having a composition substantially different from the composition of the bonding agent component of the additives 120. In this way, the composition of the resulting structure may be different from the original composition of the biosoluble fibers 100, that may, for example, result in an increased operational temperature limitation, and/or improved chemical durability. Additionally, when silica in the biosoluble fiber 100 reacts with the bonding agent during the sintering step 200, the resulting structure may have a reduced propensity to precipitate cristabolite since the silica is in a more stable form, such as an amorphous glass compound or a crystallized ceramic.

In a first exemplary embodiment of the present invention, a frit, such as the Frit 3249, available from the Ferro Corporation, is used as a bonding agent in the additives 120 with biosoluble fibers 100, such as ISOFRAX fibers. The Frit 3249 has a chemical composition of: 3.5% CaO; 12.2% MgO; 28.9% $B_2O_3$; 13.3% $Al_2O_3$; and 42.1 $SiO_2$. The curing step 160 can be performed by drying the part at the fluid removal step 180, and removing organic binders, such as HPMC and pore formers, such as carbon particles, at the organic removal step 190. In this system, the pore former burnout step 220 must be controlled so that the exothermic reaction of the oxidation of the carbon pore formers does not increase the temperature of the substrate at or near the glass formation temperature of the frit (800° C.), or at or near the operational temperature limit of the biosoluble fiber (1,250° C.). In this exemplary embodiment, the sintering step 200 can be performed by heating the extruded substrate to 1,100° C. to permit the reaction formation of bonds 110.

In a second exemplary embodiment of the present invention, an acid alumina phosphate is used as a bonding agent in the additives 120 with biosoluble fibers 100. Acid alumina phosphate refers to a liquid solution of phosphoric acid ($H_3PO_4$) and an aluminum salt (e.g., aluminum hydroxide), such that the proportion of acid is above that needed to form solid aluminum phosphate (e.g., $Al(PO_3)_3$ or $AlPO_4$). Phosphoric acid itself can be used as a bonding agent, but the addition of aluminum enhances the bonding ability. In this embodiment, ISOFRAX fibers are mixed with the acid alumina phosphate, and organic binders and pore formers, such as HPMC and carbon particles, and flour, with water added as necessary to attain the desired rheology for extrusion. During the sintering step 200, the formation of crystalline and amorphous aluminum phosphate solid phases occurs, along with a reaction formation of glass bonds between the biosoluble fibers. The embodiment is more robust in that it is less susceptible to exothermic thermal effects of the pore former burnout step 220, though the temperature of the substrate should not exceed the operational limits of the biosoluble fibers during the curing step 160.

It is not necessary that the resulting structure maintain the biopersistence characteristics of the biosoluble fiber 100 after the completion of the sintering step 200. The occupational hazards purportedly associated with the handling of refractory ceramic fibers are greatly diminished when the fibers are encapsulated in a final product, such as the extruded, and fully sintered substrate of the present invention. The reaction formation of bonds 110 that alter the chemical characteristics of the biosoluble fiber 100 as herein described may result in improved performance, while providing the occupational benefits of handling materials that are exonerated from designation as a hazardous material. Additionally, the bonded ceramic fibers are not expected to shed loose fibers into the environment and cause adverse health effects.

Referring back to FIG. 2, the method of the present invention proceeds to the final assembly step 170 upon completion of the sintering process 200 of the curing step 170. In this final assembly step 170, the fully sintered substrate can be configured into a number of forms for its intended application. These include, without limitation, coring, plugging, skinning, and canning operations that ultimately prepare and package the completed substrate into its final form and configuration. It will be appreciated that the specific order of processing can be altered in any number of configurations. For example, the plugging of alternate channels to configure the substrate into a wall-flow configuration can be performed on a green substrate so that the calcination of the plugging material can be performed at the same time as the sintering/bonding step 200, to conserve in the overall cost of fabrication.

Figure 4:
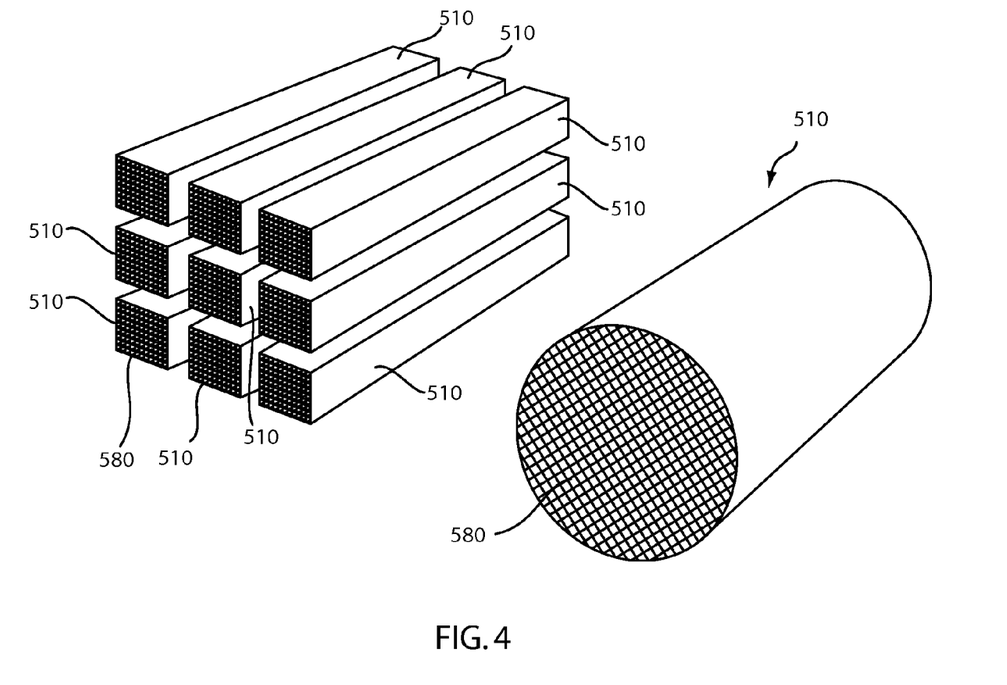
FIG. 4 is a depiction of various honeycomb substrates according to the present invention.

Referring to FIG. 4, a honeycomb substrate 510 is shown. The substrate 510 has an array of channels 580 that are each separated by channel walls comprising the resulting fibrous structure from biosoluble fibers as herein described. The substrate 510 can be fabricated in any number of shapes, such as cylinders, pie-shaped wedges (sub-cylindrical sections) or rectangular modules that can be glued together in an array to form a segmented substrate. The adhesive used to glue together substrate segments can include biosoluble fibers that effectively lower the elastic modulus of the adhesive material, to provide increased elasticity, without the potential for occupational exposure to potentially hazardous refractory ceramic fibers.

Figure 5:
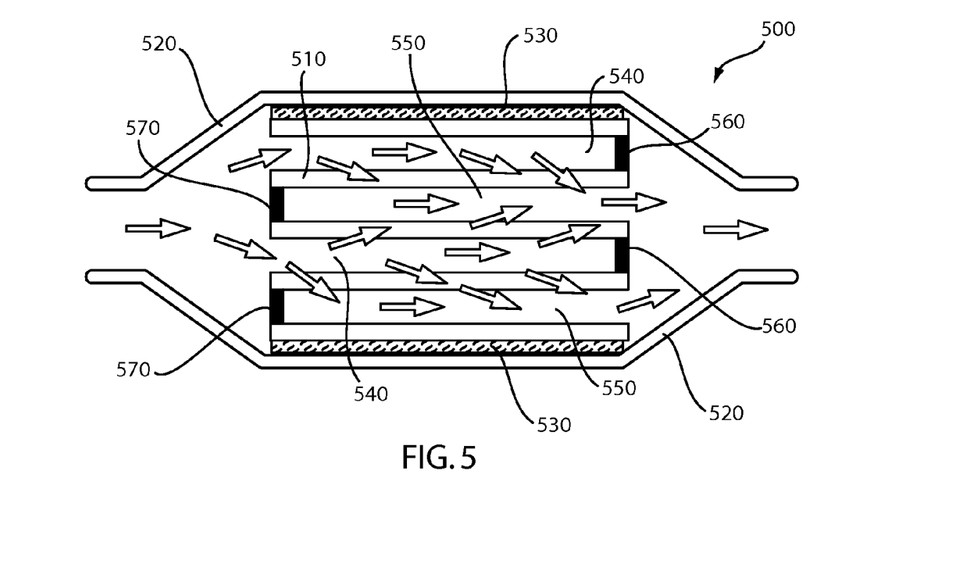
FIG. 5 is a cross-sectional representation of a filtration device that contains a honeycomb substrate according to the present invention.

FIG. 5 depicts a cross-sectional representation of a filtration device 500 with a honeycomb filter 510 produced by the methods of the present invention. The filter device 510 typically has the form of a housing 520 supporting the honeycomb filter 510 with an intumescent or non-intumescent, or hybrid mat 530 to form an air-tight seal between the housing 520 and the filter 510. The filter 510, as shown, is configured in a wall-flow configuration by selectively plugging alternate channels, with inlet channel blocks 560 and outlet channel blocks 570 to form a plurality of respective inlet channels 540 and outlet channel blocks 570 to form a plurality of respective inlet channels 540 and outlet channels 550. In this configuration, the open network of pores created by the space between the fibrous structure formed from reaction-bonded biosoluble fibers 100, resulting from the methods of fabrication according to the present invention, provides sufficient porosity and permeability necessary to permit flow through the porous walls between the inlet channels and the adjacent outlet channels. in this way, particulate matter can be accumulated on the surface of the inlet channel walls, and be thus removed from the filtrate stream through the filter device 500. The resulting fibrous structure formed from reaction-bonded biosoluble fibers within the substrate 510 can also be coated with a catalyst to facilitate oxidation of accumulated soot and to accelerate the conversion of exhaust gas into less-harmful constituents.

Any number of catalysts and washcoats can be disposed within the honeycomb filter 510 to chemically alter combustion byproducts in the exhaust stream by catalysis. Such a catalyst includes but is not limited to platinum, palladium (such as palladium oxide), rhodium, derivatives thereof including oxides, and mixtures thereof. In addition, the catalysts are not restricted to noble metals, combination of noble metals, or only to oxidation catalysts. Other suitable catalysts and washcoats include chromium, nickel, rhenium, ruthenium, silver, osmium, iridium, platinum, tungsten, barium, yttrium, neodymium, lanthanum, gadolinium, praseodymium, and gold, derivatives thereof, and mixtures thereof. Other suitable catalysts include binary oxides of palladium, aluminum, tungsten, cerium, zirconium, and rare earth metals. Other suitable catalysts include vanadium and derivatives thereof, e.g., $V_2O_5$, or silver or copper vanadates, particularly when sulfur is present in the fuel or lubricant. Catalyst materials can also include zeolites, metal-substituted zeolites (for example, Cu-zeolite, Fe-zeolite, etc.), alumina, ceria, zirconia, and titania-based washcoats. Further still, the substrate 510 can be configured with a combination of catalysts applied to different sections or zones to provide a multi-functional converter (for example, a four-way converter), or a de-NOx filter. For example, the substrate 510 can be used as a particulate filter with soot-oxidizing catalysts applied to the inlet channel walls, with a NOx adsorber, or selective catalyst reduction catalyst applied to the internal fibrous structure in the channel walls. Similar configurations can be applied to provide lean NOx traps (LNT), NOx adsorbers, or 4-way catalytic converters.

Additionally, the constituents of the fiber that result in acceptable biopersistence testing to designate a fiber as biosoluble can also enhance the reactivity of the substrate as a catalytic host. For example, barium, magnesium and calcium oxides, and alkali metal compositions can be used in washcoats applied to honeycomb substrates for NOx storage and reduction. These alkali metal constituents, and other compositions that enhance the biosolubility of the original fiber, can contribute in catalytic functionality in the honeycomb substrate of the present invention. Additionally, the washcoat and catalytic materials that can be applied to the honeycomb filter 510 to further suppress the formation or precipitation of free silica and/or cristabolite, as well as coat the fiber to provide enhanced strength and resistance to chemical environments.

Alternative embodiments of the present invention can also be provided in a flow-through configuration, for example, in a non-filtration catalytic host, such as a conventional three-way catalytic converter. Additionally, the use of biosoluble fibers for a catalytic host and/or as a filter can be advantageous when the processed fluid or filtrate is sensitive to exposure to certain materials or environments. For example, the filtration of blood, body fluids, and biological fluids may exhibit reactions, such as rejections, when introduced into the bloodstream of a living being or organism. In this embodiment, the biosoluble fiber can be composed of synthetic bone materials to fabricate a substrate as described herein. Various blood filtration and/or medical or clinical processes can be performed using substrate according to this embodiment.

The present invention has been herein described in detail with respect to certain illustrative and specific embodiments thereof, and it should not be considered limited to such, as numerous modifications are possible without departing from the spirit and scope of the appended claims.

What is claimed is:

1. An extruded porous honeycomb substrate comprising:
    an extruded honeycomb array of channels forming walls between adjacent channels;
    the walls having a porous structure comprising an open network of pores formed from intertangled of biosoluble fibers; and
    the biosoluble fibers having bonds between adjoining fibers within the structure.

2. The substrate according to claim 1 wherein the bonds between adjoining fibers within the structure are glass bonds.

3. The substrate according to claim 2 wherein the glass bonds comprise a glass having a coefficient of thermal expansion substantially the same as a coefficient of thermal expansion of the biosoluble fibers.

4. The substrate according to claim 1 wherein the porous structure comprising an open network of pores has a porosity between 40% and 80%.

5. The substrate according to claim 1 wherein the biosoluble fibers are more than 75 weight percent of a composition of the porous structure.

6. The substrate according to claim 1 wherein the biosoluble fibers have a distributed aspect ratio with a mode between 3 and 50,000.

7. A method of forming a porous substrate of claim 1 comprising:
    mixing biosoluble fibers with an organic additive, an inorganic additive, and a fluid to provide an extrudable mixture;
    extruding the extrudable mixture into a green honeycomb substrate;
    heating the green substrate to remove the fluid and the organic additive; and
    sintering the green substrate to reaction-form bonds between the biosoluble fibers using the inorganic additive.

8. The method according to claim 7 wherein the inorganic additive comprises a frit.

9. The method according to claim 7 wherein the inorganic additive comprises a sol.

10. The method according to claim 9 wherein the sol further comprises a dispersion of alumina particles in a boric acid solution.

11. The method according to claim 7 wherein the organic additive comprises a binder.

12. The method according to claim 11 wherein the organic additive further comprises a pore former.

13. The method according to claim 12 wherein the heating step further comprises:
    heating the green substrate to a first temperature to remove the fluid;
    heating the green substrate to a second temperature to remove the binder;
    heating the green substrate to a third temperature to remove the pore former; and wherein each of the first temperature, second temperature, and third temperature is less than a glass transition temperature of the biosoluble fibers.

14. The method according to claim 7 wherein the sintering step is performed at a temperature less than a devitrification temperature of the biosoluble fibers.

15. The method according to claim 14 wherein the bonds reaction-formed between the biosoluble fibers comprise a glass having a coefficient of thermal expansion approximately and substantially the same as a coefficient of thermal expansion of the biosoluble fibers.

16. A filter comprising:

a housing having an inlet and an outlet;

an extruded honeycomb substrate mounted within the housing, the substrate comprising;

an extruded honeycomb array of channels forming porous walls between adjacent channels; and the walls having a structure comprising an open network of pores formed from intertangled inorganic fibers having a composition comprising 60-85% by weight silica and 14-40% by weight of at least one kind of compound selected from the group consisting of an alkali metal compound, an alkali-earth metal compound, and a boron compound.

17. The filter according to claim 16 wherein the extruded substrate further comprises a plurality of substrate segments joined into a single unit with an adhesive.

18. The filter according to claim 17 wherein the adhesive comprises biosoluble fibers.

19. The filter according to claim 16 wherein the extruded substrate further comprises a wall-flow configuration.

20. The filter according to claim 19 wherein the extruded substrate further comprises at least one of a catalyst deposited on the inorganic fibers.

* * * * *

UNITED STATES PATENT AND TRADEMARK OFFICE
CERTIFICATE OF CORRECTION

PATENT NO. : 7,567,817 B2  
APPLICATION NO. : 11/748306  
DATED : July 28, 2009  
INVENTOR(S) : Liu et al.

It is certified that error appears in the above-identified patent and that said Letters Patent is hereby corrected as shown below:

At column 6, line 22:  
Replace "Theological" with "rheological"

Signed and Sealed this  
Twenty-second Day of February, 2011

David J. Kappos  
*Director of the United States Patent and Trademark Office*